United States Patent [19]
Toyohara et al.

[11] Patent Number: 6,135,085
[45] Date of Patent: Oct. 24, 2000

[54] CONTROL APPARATUS FOR USE IN INTERNAL COMBUSTION ENGINE

[75] Inventors: Masahiro Toyohara, Hitachioota; Takeshi Atago; Toshio Hori, both of Hitachinaka, all of Japan

[73] Assignees: Hitachi, Ltd., Tokyo; Hitachi Car Engineering Co., Ltd., Hitachinaka, both of Japan

[21] Appl. No.: 09/220,796

[22] Filed: Dec. 28, 1998

[30] Foreign Application Priority Data

Dec. 25, 1997 [JP] Japan .................................. 9-358450

[51] Int. Cl.[7] .............................. F02B 31/00; F02P 5/145
[52] U.S. Cl. ...................... 123/306; 123/301; 123/406.13
[58] Field of Search .................. 123/295, 301, 123/302, 306, 308, 406.13

[56] References Cited

U.S. PATENT DOCUMENTS

| | | | |
|---|---|---|---|
| 4,823,753 | 4/1989 | Murakami et al. | 123/306 |
| 5,609,132 | 3/1997 | Minowa et al. | 123/399 |
| 5,634,445 | 6/1997 | Nishioka et al. | 123/308 |
| 5,670,715 | 9/1997 | Tomisawa | 73/118.1 |
| 5,927,245 | 7/1999 | Uchida | 123/302 |
| 5,950,595 | 9/1999 | Yoshioka et al. | 123/399 |

FOREIGN PATENT DOCUMENTS 5-31649 of 1993 Japan.
8-74583 of 1996 Japan.

*Primary Examiner*—Erick Solis
*Attorney, Agent, or Firm*—Evenson, McKeown, Edwards & Lenahan, P.L.L.C.

[57] ABSTRACT

A failure diagnosis apparatus for an internal combustion engine having an intake air swirl control valve, includes a broken wire detection unit, a target opening degree/actual opening degree deviation detection unit, an opening degree abnormally detection unit and a target opening degree execution abnormality detection unit. Outputs from these detection units are used to detect a failure of the swirl control valve which becomes a factor for inviting an aggravation of an operability such as a knocking etc.

5 Claims, 16 Drawing Sheets

CONTROL APPARATUS FOR USE IN INTERNAL COMBUSTION ENGINE

BACKGROUND OF THE INVENTION

This application claims the priority of Japanese patent document 9-358450, filed Dec. 25, 1997, the disclosure of which is expressly incorporated by reference herein.

The present invention relates to a control apparatus for use in an internal combustion engine, having failure diagnostic device which diagnoses the failure of a swirl control valve. In particular, the control apparatus according to the invention diagnoses a failure of the swirl control valve for imparting a swirl (rotating) flow to an intake air flow to an in-cylinder injection engine, and assures proper operation of the engine during the failure.

In a conventional in-cylinder injection type engine, since lean combustion is necessary to maintain an air-fuel (A/F) ratio of more than 40, in the combustion chamber of a cylinder, a degree of gas fluidity (called a swirl or tumble) is provided. Various techniques can achieve such gas fluidity; in general, however, a combination of the shape of the air intake conduit and a swirl control valve are used to generate a proper gas fluidity.

A conventional internal combustion engine providing such a swirl control valve is disclosed, for example, in Japanese patent application publication No. Hei 5-31649. In that arrangement, in order to avoid degrading operability of the engine, the pressure in the air intake conduit is detected, for controlling a negative pressure change-over valve and alternation of an air fuel ratio target value. In this conventional prior technique, when the swirl control valve cannot be maintained in a closed state, operation of the change-over valve and the alternation of the air-fuel ratio target value are carried out. However, a diagnosis of whether or not the swirl control valve itself is operating normally is not provided for.

It is well known that at a full open state of a swirl control valve such as described above, very little swirl is generated in the intake air flow. On the other hand at a nearby fully closed state, the amount of swirl is large. Further, when the air-fuel ratio is controlled to a lean air-fuel ratio (relative to a stoichiometric air-fuel ratio), it has known that the amount of HC (hydro-carbon) in the exhaust gas varies inversely with the occurrence of the swirl by the swirl control valve.

Accordingly, when an engine is operated at a lean air-fuel ratio, control of the swirl control valve has a large effect on operability of the engine especially with regard to exhaust gas content. Thus, diagnosis whether the swirl control valve is operating normally is extremely important for controlling engine performance and improving fuel combustion.

Japanese patent application laid-open publication No. Hei 8-74583 discloses a technique for improving the exhaust gas characteristic in the lean combustion operation control for an internal combustion engine, by diagnosing the operation of the swirl control valve itself. In this technique, a signal corresponding to the actual valve opening degree in response to a swirl control valve opening command signal based on the operating condition of the internal combustion engine (for example a detected signal such as a pressure etc. of an air intake conduit in the vicinity of the swirl control valve, according to a pressure sensor) is compared with a predetermined standard opening degree characteristic, and it is determined that an abnormality of the swirl control valve has occurred when there is a deviation of more than a predetermined value.

In general, the greater the extent to which the amount of swirl in the air flow (swirl number) supplied to an engine combustion chamber increases naturally with increasing air amount, the more the engine becomes a high speed and a high torque. Accordingly, it is necessary to be able to control a small opening of the swirl control valve when the engine speed and torque are high. Moreover, it is necessary to control the opening degree of the swirl control valve taking into the consideration the operation conditions and the combustion condition, under other conditions as well.

The stability of the combustion of the engine, as well as the incidence of exhaust smoke and HC (hydro-carbon) etc., depend on the fuel injection timing and the ignition timing of the fuel injector, which must be taken into consideration in combustion control. In particular, the stability of the combustion of the engine and the occurrence of HC (hydro-carbon) etc. are affected by the amount of swirl (the "swirl number"). By selecting the swirl flow, it is known that the most stable combustion and the minimum occurrence of HC (hydrocarbon) can be achieved. Further, it is also known that the stability of the combustion and the occurrence of HC (hydrocarbon) etc. are affected by the pressure of the fuel which is injected from the fuel injector. As a result, to adjust the swirl flow in opening and closing control of the swirl control valve, it is necessary take into consideration the combustion condition and the fuel pressure to achieve stability of combustion etc. Further, when an abnormality occurs in a control system etc. of the engine, in order to remove the factors which can degrade engine operability (such as the knocking), it is necessary to control the ignition timing in a suitable manner.

However, in the above described conventional prior art techniques, with regard to the operating condition of the internal combustion engine, a signal corresponding to the actual valve opening degree (such as the pressure change in the air intake conduit according to a pressure sensor) in response to a swirl control valve opening command signal is detected. This signal is then compared with a previously determined standard opening degree characteristic, and it is determined that an abnormality of the swirl control valve exists when there is a deviation which exceeds a predetermined value. However, there is no consideration of the abnormality or failure etc. of the swirl control valve itself; accordingly it is impossible to curtail exactly the degradation of engine operability during the abnormality or failure.

SUMMARY OF THE INVENTION

An object of the present invention is to provide a control apparatus for use in an internal combustion engine, and in particular to a diagnosis apparatus for use in the internal combustion engine, which can reliably diagnose a swirl control valve of the internal combustion engine, even when a failure occurs, whereby operability of the engine can be maintained favorably.

To attain the above stated objects, the control apparatus according to the invention for use in an internal combustion engine comprises a drive control apparatus for a swirl control valve which is arranged in an air intake port, and a failure diagnosis apparatus for diagnosing a failure of the swirl control valve. The failure diagnosis apparatus comprises a failure detection unit for detecting a failure of the swirl control valve, and a failure judgment unit.

In the control apparatus according to the present invention as constituted above, since the control apparatus comprises failure diagnosis apparatus for diagnosing a failure of the swirl control valve, the failure of the swirl control valve itself is detected by the broken wire detection means of the failure diagnosis apparatus. That is, the broken wire of a control line of the swirl control valve is detected. Accordingly, when control of the opening of the swirl control valve becomes impossible due to a broken wire, it remains possible to carry out suitably the ignition timing etc., which becomes the factor for degrading engine operability such as the knocking etc.

Further, the opening degree deviation value detection means determines with an absolute value the deviation between the actual valve opening of the swirl control valve and the target opening. Hence, the motion condition of the swirl control valve can be grasped exactly.

Further, since the deviation between the actual opening and the target opening is detected with an integral value, the motion condition of the swirl control valve can be grasped quantitatively. Thus, it is possible to increase the detection accuracy.

Further, according to the deviation value judgment means, when the deviation value which is detected by the opening degree deviation value detection means is more than a regulation value, a failure judgement is made. As a result, it is possible to carry out suitably the ignition timing etc. which becomes the determining factor for degradation of the operation property such as the knocking etc.

Further, according to the opening degree sensor judgment means, the opening detected by the valve opening degree sensor is compared with the sensor output range which is given by the valve opening degree sensor, and the quality of the valve opening degree is judged. As a result, it is possible to judge of the output of the valve opening degree sensor itself.

Further, according to the "bug" judgment means, the target opening degree through the execution using the main control part and the sub control part can be collated. As a result, it is possible to debug the main control part itself.

Further, according to the failure judgment means and the fail safe control means, when an NG judgment output is generated from any one of the broken wire judgement means, the deviation value judgement means, the opening degree sensor judgment means and the bug judgment means, the present intake air amount is requested through the execution; and to accept this air amount in the normal area, fuel cut control is performed. Accordingly, it is possible to carry out suitably the ignition timing etc. which becomes the determining factor for degradation of engine operability, such as the knocking etc.

Further, according to the failsafe control means, when an NG judgment output is generated by any one of the broken wire judgement means, the deviation value judgement means, the opening degree sensor judgment means and the bug judgment means, by lighting the warning lamp, the driver can be warned accordingly.

Further, according to the failsafe control means, when an NG judgment output is generated by any one of the broken wire judgement means, the deviation value judgement means, the opening degree sensor judgment means and the bug judgment means, a determination is made whether or not the present ignition timing occurs during the closing control of the swirl control valve. When it is determined to be during the closing control, the ignition timing can be made gradually. Accordingly the occurrence of the knocking etc. can be restrained and, therefore a normal operation feeling for the engine can be maintained, and an abrupt torque rise can be prevented.

Further, according to NG counter, when an NG judgment from the broken wire judgement means, the deviation value judgement means, the opening degree sensor judgment means or the bug judgment means reaches a regulation number, a signal is output. As a result, an error judgment due to a count-up of the NG counter by noises etc. can be prevented.

Other objects, advantages and novel features of the present invention will become apparent from the following detailed description of the invention when considered in conjunction with the accompanying drawings.

DETAILED DESCRIPTION OF THE INVENTION

Hereinafter, a control apparatus for use in an internal combustion engine of one embodiment according to the present invention will be explained referring to drawings.

Figure 1:
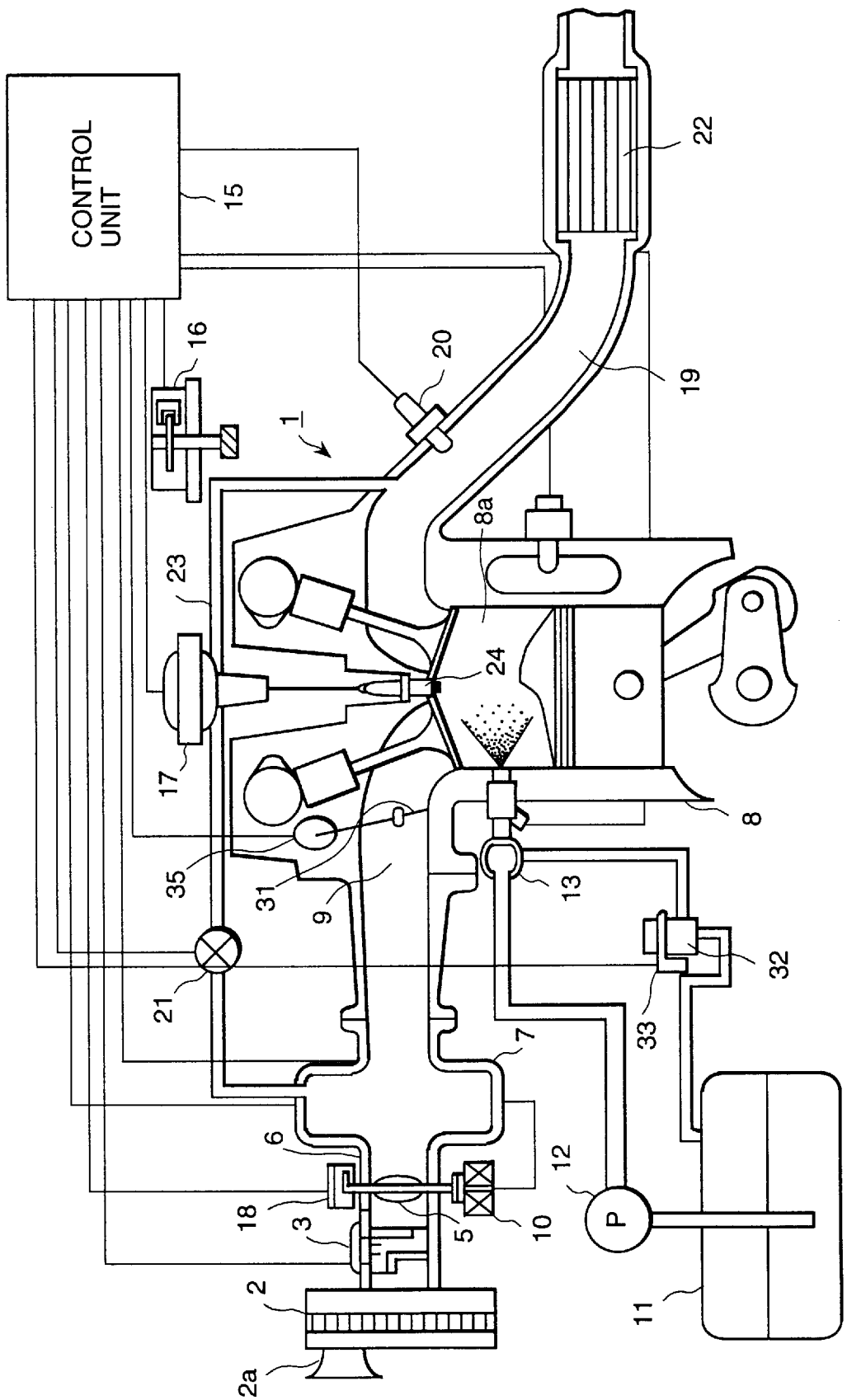
FIG. 1 is a schematic depiction of a control system for use in an in-cylinder injection engine of one embodiment according to the present invention.

FIG. 1 is a schematic illustration of a control system for use in an in-cylinder fuel injection engine according to one embodiment of the control apparatus of the present invention, for use in an internal combustion engine. In FIG. 1, the air taken into an internal combustion engine 1 passes through an inlet port 2a of an air cleaner 2, an intake air flow meter 3, and a throttle valve body 6 with a throttle valve 5 for controlling an air intake air flow, and enters into a collector 7.

The throttle valve 5 is driven by a motor 10 to control the intake air flow.

The air from the collector 7 is distributed to air intake conduits which are connected to combustion chambers 8a of respective cylinders 8 of the engine 1, via air intake pipes 9, each of which includes a swirl control valve 31 and a motor actuator 35. The swirl control valve 31 controls an air intake opening to the cylinders 8, and the electric motor actuator 35 adjusts the opening of the swirl control valve 31. By controlling the swirl control valve 31, a deflection force is imparted to the air passing through, which is mixed with vaporized fuel in the combustion chamber 8a of the cylinder 8, as explained below. The deflection force controls the strength of the swirl, and thereby substantially influences the combustion condition.

A fuel pump 12 sucks fuel (such as gasoline) from a fuel tank 11 and supplies pressurized fuel to fuel system comprising a fuel injector 13 and a variable fuel pressure regulator 32 for controlling the fuel pressure within a predetermined range. The fuel pressure is measured by a fuel pressure sensor 33. The fuel is injected into the combustion chamber 8a from the injectors 13 via a fuel injection port. The air and the injected fuel are mixed, ignited and burned in the combustion chamber 8a, by an ignition plug 24, according the piezo electric effect from the ignition coil 17.

The exhaust gas from the combustion chamber 8a is led into an exhaust pipe 19 and discharged into the atmosphere via a catalyst 22. A portion of the exhaust gas which flows through the exhaust pipe 19 is recirculated to the collector 7 through a piping member 33. An electronic control EGR valve 21 arranged in the piping member 33 controls the amount of exhaust gas which is recirculated. This electronic control EGR valve 21 controls electrically an opening according to the difference in pressure before and after the EGR valve, and the air-fuel ratio of the exhaust gas is determined as a result the EGR amount.

The air flow meter 3 generates a signal indicating the amount of intake air flow, which is inputted to a control unit 15. Further, the throttle valve body 6 has a throttle valve sensor 18 for detecting the opening degree of the throttle valve 5, and an output thereof is also inputted to the control unit 15.

A crank angle sensor 16, which is driven rotatively by a cam shaft (not shown in figure) of the engine 1, generates a signal indicating the rotation position of the crank shaft, with the accuracy of at least 2–4° degree. This signal is also inputted to the control unit 15.

The injection timing, the ignition timing and the opening degree of the swirl control valve 31 etc. are controlled by the above signals.

A/F sensor 20 provided on the exhaust pipe 19 detects and outputs a signal indicating the actual operation air-fuel ratio from the components of the exhaust gas. This signal is also inputted to the above stated control unit 15. The details of the sensor 20 are well known to those skilled in the art, and will be omitted here other than to note that the characteristic has a proportional relationship.

Figure 2:
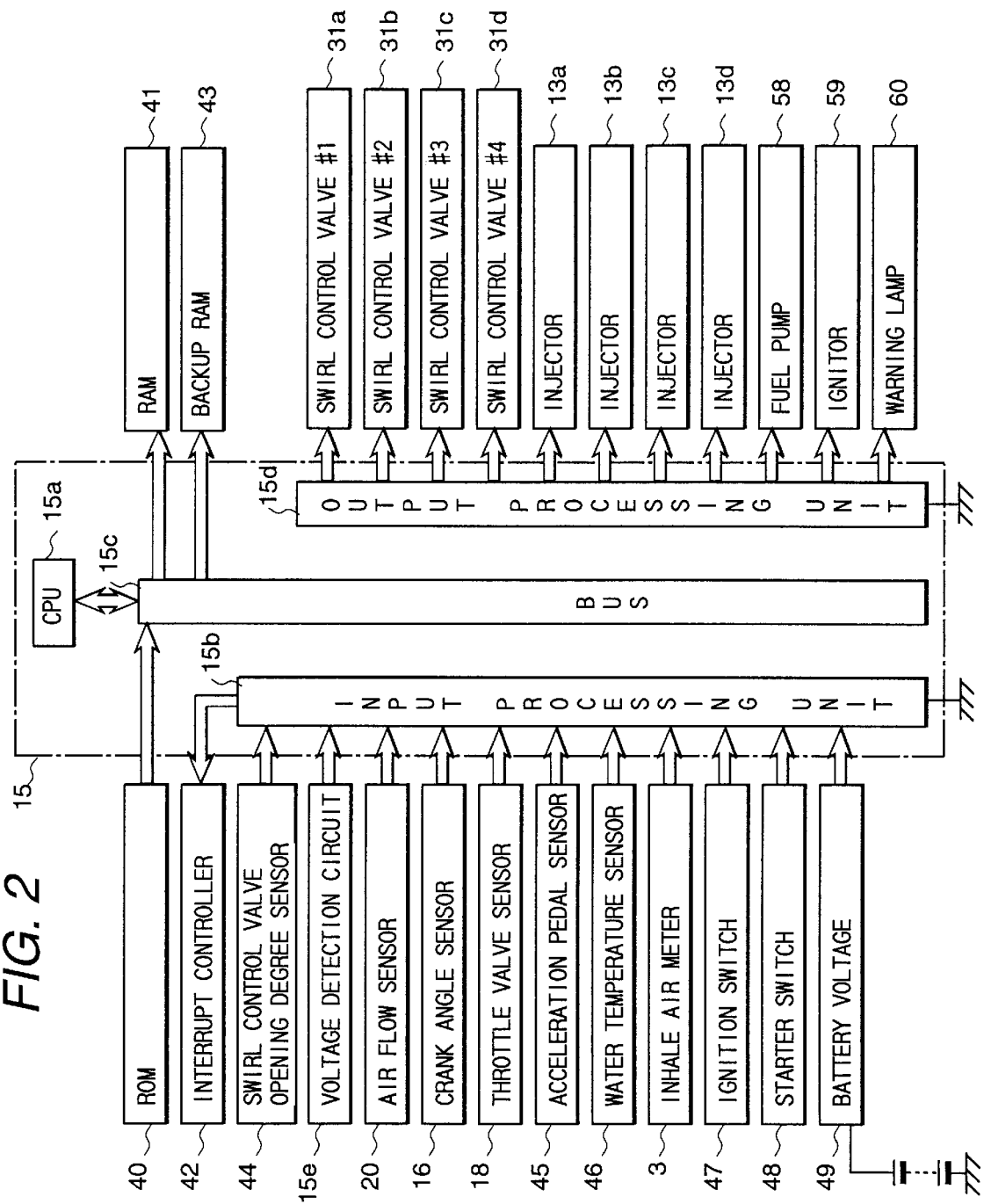
FIG. 2 is a block diagram showing a control unit of FIG. 1.

FIG. 2 shows a control system in the above stated control unit 15. (In the figures which are explained hereinafter, parts which are the same as parts shown in FIG. 1 are denoted with the same reference numerals.) The control unit 15 includes a CPU 15a which constitutes a main body of the control, an input processing unit 15b (for example, an A/D converter etc.) for processing detection signals from the various kinds of sensors described hereinafter a bus 15c for transferring data, and an output processing unit 15d for outputting data processed by the CPU 15a.

The input processing unit 15b receives detection signals from one or more of the swirl control valve opening degree sensor 44, a voltage detection circuit 15e, the air flow sensor 20, the crank angle sensor 16, the throttle valve sensor 18, an acceleration pedal sensor 45, a water temperature sensor 46, the intake air flow meter 3, an ignition switch 47, a starter switch 48, and a battery voltage detection means 49. These detection signals are processed in a predetermined manner by the input processing unit 15b, and are converted to data which are input to the above stated CPU 15a through the bus 15c.

Further, the input processing unit 15b also transmits an interrupt signal to the interrupt controller 42.

The bus 15c transfers the various kinds of detection data (referred to above) to the CPU 15a, which processes the data in accordance with predetermined programs stored in ROM 40. Thereafter, the processed data are stored in RAM 41 and a backup RAM 43, and control signals are outputted through the output processing unit 15d to control the swirl control valves (#1–#4) 31a–31d, the injectors 13a–13d, the fuel pump 58, 15 the ignitor 59, and a warning lamp 60.

Figure 3:
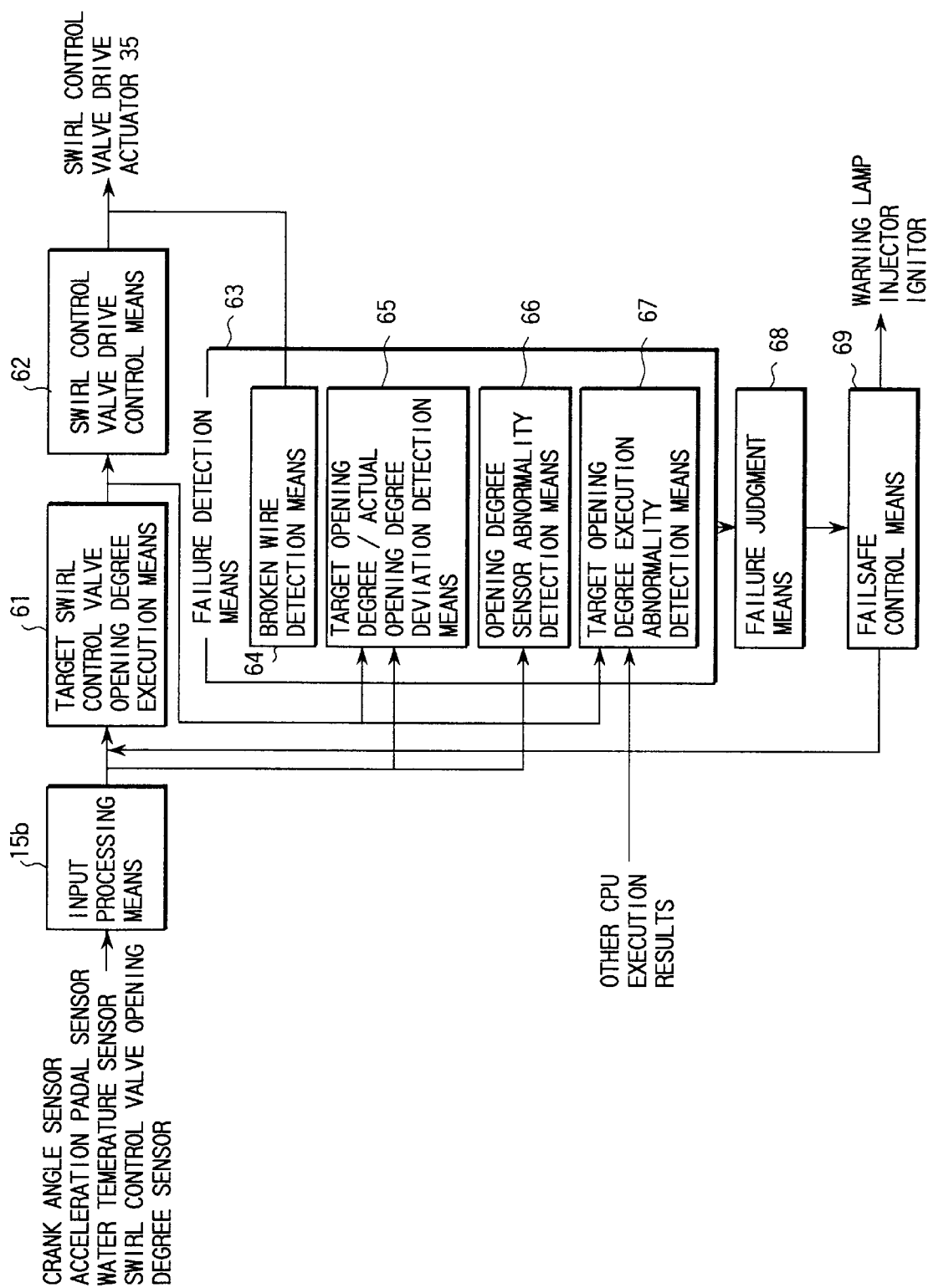
FIG. 3 is a block diagram showing a control apparatus including a failure detection means which is provided in the control unit of FIG. 1.

FIG. 3 shows a block diagram of a drive control system and a system for detecting a failure of the swirl control valve 31 which is provided on the above stated control unit 15, and the control system according to the failure detection. Detection signals from the crank angle sensor 16, the acceleration pedal sensor 45, the water temperature sensor 46 and the swirl control valve opening degree sensor 44 etc. are taken in through the input processing unit 15b and the target opening degree execution unit 61 performs processing for requesting the optimum value of the opening degree of the swirl control valve 31. A swirl control valve drive control means 62 drives a swirl control valve drive actuator 35 (a stepping motor), to achieve the above stated optimum opening degree.

The respective outputs of the input processing unit 15b, the target opening degree execution unit 61 and the swirl control valve drive control unit 62 are detected by the failure detection unit 63. In accordance with the detection results, the failure judgment unit 68 judges the failure, and causes the failsafe control unit 69 to change the target opening degree via the target opening degree execution unit 61. It also controls the lighting of the warning lamp 60, and the operation of the injectors 13a–13d and the ignitor 59, etc.

The failure detection unit 63 includes a broken wire detection unit 64 for detecting a broken wire in the drive system of the swirl control valve 31, a unit 65 for determining the magnitude of a deviation between the target opening degree and the actual opening degree of the swirl control valve 31, an opening degree sensor abnormality detection unit 66, and a target opening degree execution abnormality detection unit 67, etc.

Figure 4:
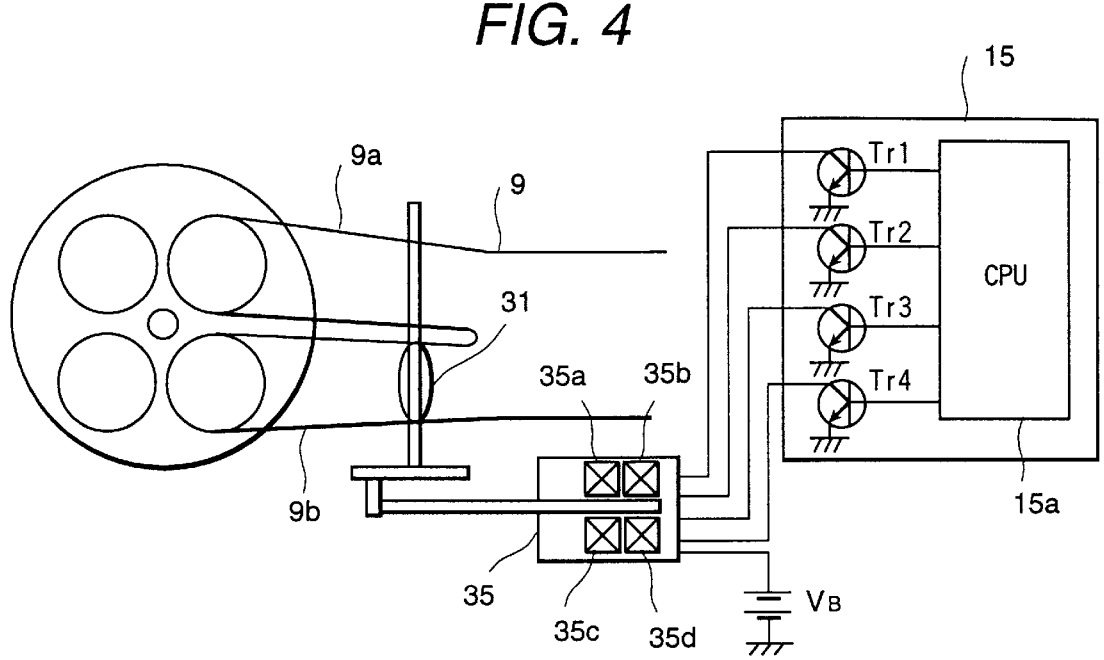
FIG. 4 shows a drive system of the swirl control valve of FIG. 1.

FIG. 4 shows the drive system of the swirl control valve 31 of FIG. 1. The swirl control valve 31 is provided to selectively close one of in two air intake ports 9a and 9b of the above stated air intake conduit 9 which communicate to the respective cylinders 8 of the engine 1. The stepping motor 35, having exciting coils 35a–35d, is installed to open or close the swirl control valve 31, using electric power from a battery power supply VB. The CPU 15a in the control unit 15 controls the adjustment of the opening degree of the swirl control valve 31, by driving (for example) four transistors Tr1, Tr2, Tr3 and Tr4 in the order Tr1→Tr2→Tr3→Tr4 to rotate the stepping motor 35 in one ("normal") direction, and in the order Tr4→Tr3→Tr2→Tr1 to rotate the stepping motor 35 in the reverse direction.

Figure 5:
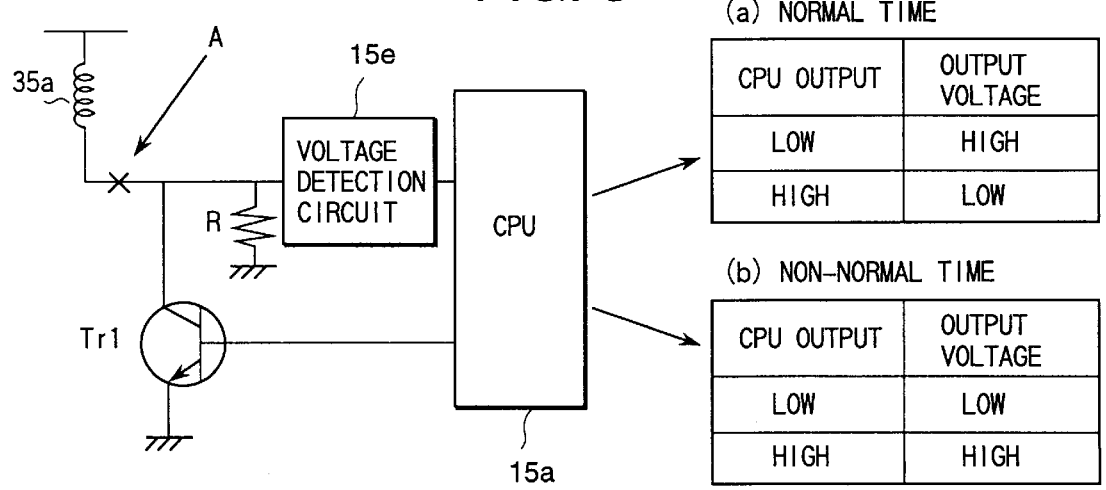
FIG. 5 shows a detection system for detecting a broken wire of the swirl control valve of FIG. 4.

FIG. 5 shows the system for detecting a broken wire (for example, between one of the above stated exciting coil 35a–d and the transistor Tr1). Herein, for the convenience of the explanation, only the exciting coil 35a and the transistor Tr1 are shown; however, similar detection is also carried out between other exciting coils 35b–35d and the transistors Tr2–Tr4.

Between the exciting coil 35a and CPU 15a, a voltage occurrence resistor R and a voltage detection circuit 15e are provided. In the normal condition where no broken wire occurs, as shown in the upper table of FIG. 5, when the output from CPU 15a to the transistor Tr1 is "low", the transistor Tr1 is turned "off", so that the voltage detection circuit 15e detects the voltage of the voltage occurrence resistor R. Thus, a "high" signal is outputted from the voltage detection circuit 15e to CPU 15a. On the other hand, when the output from CPU 15a to the base of the transistor Tr1 is "high", the transistor Tr1 turns "on", shorting the voltage occurrence resistor R to ground. Accordingly, no voltage occurs at the voltage occurrence resistor R, and a "low" signal is outputted from the voltage detection circuit 15e to CPU 15a. In this case, the CPU 15a detects no broken wire.

On the other hand, for example when a broken wire exists at point A of the control line in FIG. 5, as shown in the lower table, when the output from CPU 15a to the base of the transistor Tr1 is "low", so that the transistor Tr1 is turned "off", still no voltage occurs on the voltage occurrence resistor R, because the interruption of the circuit prevents any flow of current. Accordingly, the signal from the voltage detection circuit 15e to CPU 15a is "low". On the other hand, when the output from CPU 15a to the base of the transistor Tr1 is "high", and transistor Tr1 is turned "on", the voltage detection circuit 15e detects the collector voltage of the transistor Tr1, "high" signal is inputted into CPU 15a. Accordingly the CPU 15a detects existence of the broken wire.

Figure 6:
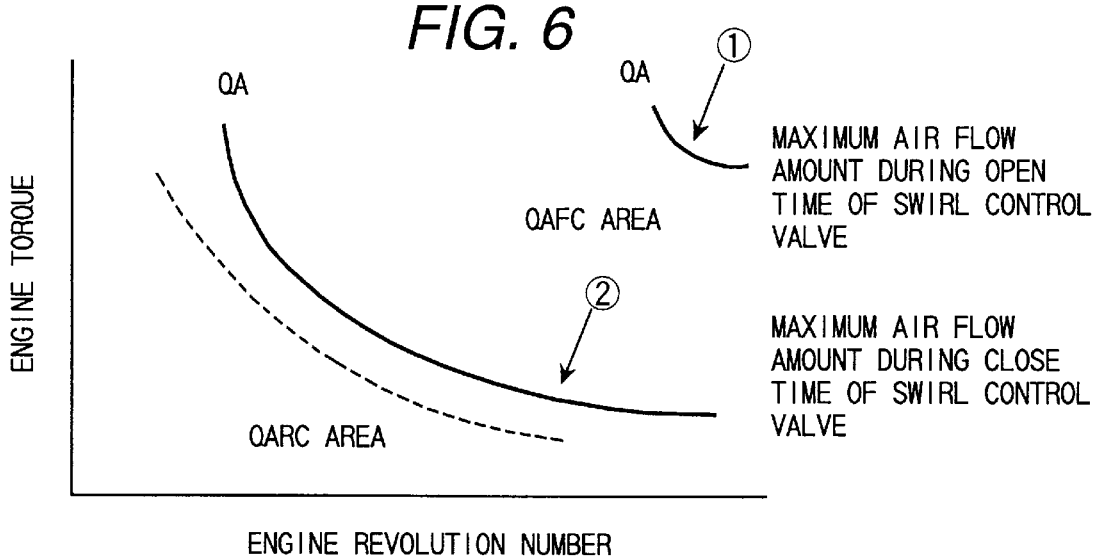
FIG. 6 illustrates the maximum air flow for different states of the swirl control valve of FIG. 1.

FIG. 6 illustrates the optimum amount of air flow according to the swirl control valve 31. When the throttle valve 5 for controlling the air flow amount is fully opened, for example, the air flow amount is controlled within QAFC area (the normal intake air amount) according to the opening degree adjustment by the swirl control valve 31. The QAFC area is a range between the intake air flow amount QA during opening of the swirl control valve 31 (shown in curve (1)) and the intake air flow amount QB during closing of the swirl control valve 31 (shown in a curve line (2)). Incidentally, QARC area shown in this figure is an area outside the normal intake air flow; in this area the aggravation of the operability is invited by the knocking etc.

Figure 7:
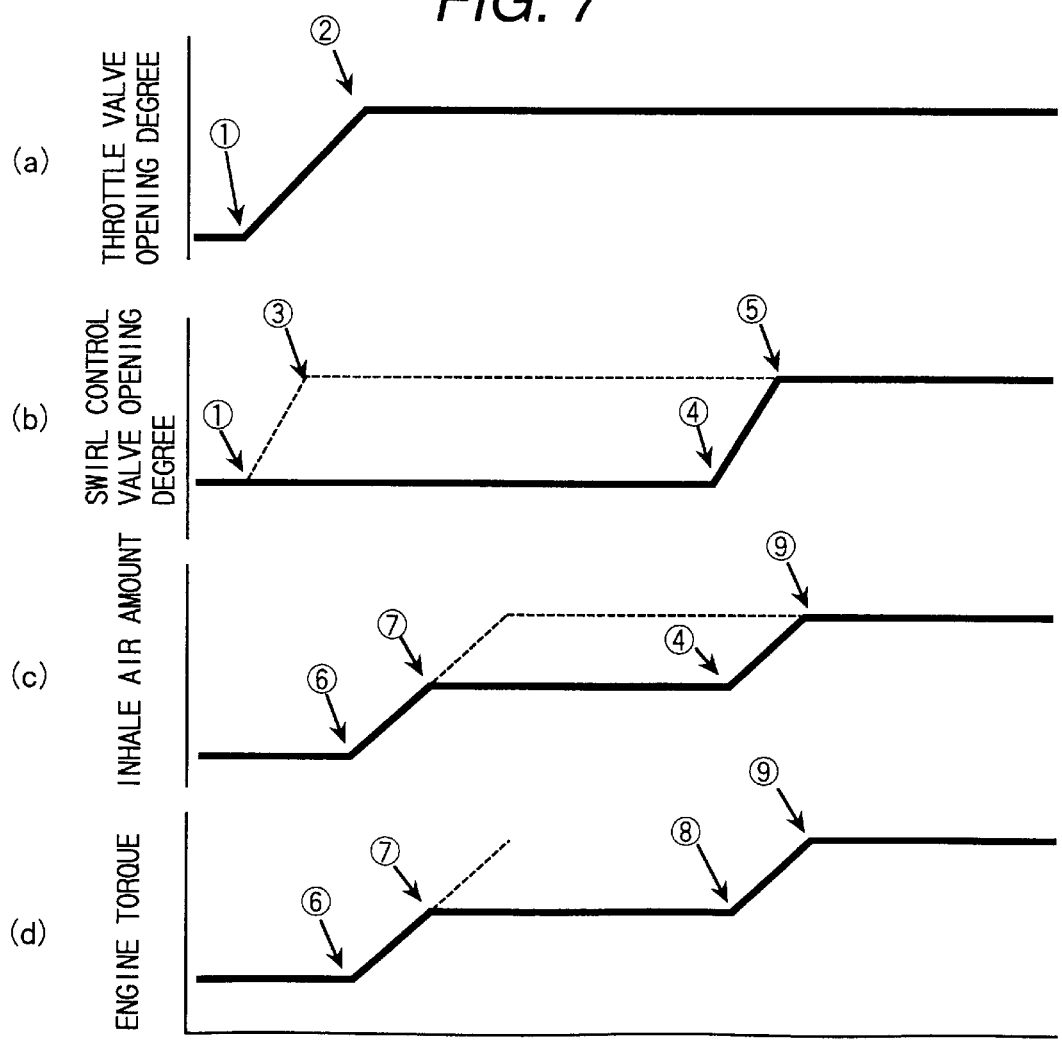
FIG. 7 is an explanatory view showing the adverse effects in a case where an abnormality occurs in the motion of the swirl control valve, according to the detection system of FIG. 5.

FIG. 7 shows the adverse effects which result from an abnormality in the motion of the swirl control valve 31 in the above case of a broken wire. At a time point (1) shown in FIG. 7(a) the throttle valve is opened, and at a time point (2), for example, it reaches the fully open condition. As shown by the dashed line in 20 FIG. 7(b), the above stated swirl control valve 31 has no broken wire; at the time point (1) the swirl valve 31 is opened and at a time point (3) it is fully opened.

However when a broken wire occurs, the stated swirl control valve 31 becomes inoperable, and an opening motion of the swirl control valve 31 cannot take place.

In this case, as shown in FIG. 7(c), the intake of air starts at a time point (6) shortly after the time point (1) shown in FIG. 7(a). However, because of the stoppage of the swirl valve 31 (solid line in FIG. 7(b)) due to the broken wire,, the intake air amount reaches a peak at a time point (7) (FIG. 7(c)), and as shown in FIG. 7(d), the engine torque also starts to rise at the time point (6), peaking at the time point (7).

Subsequently, as also shown by the solid line in FIG. 7(b), for example, at the time point (4) the broken wire is mended, and the swirl control valve 31 opens. Since the intake air restarts at the time point (4) in FIG. 7(c), the engine torque starts to rise again at a time point (8), as shown in FIG. 7(d). As stated above, when the engine torque does not rise normally, the driver experiences a sense of incompatibility, which becomes an operational aggravation.

Figure 8:
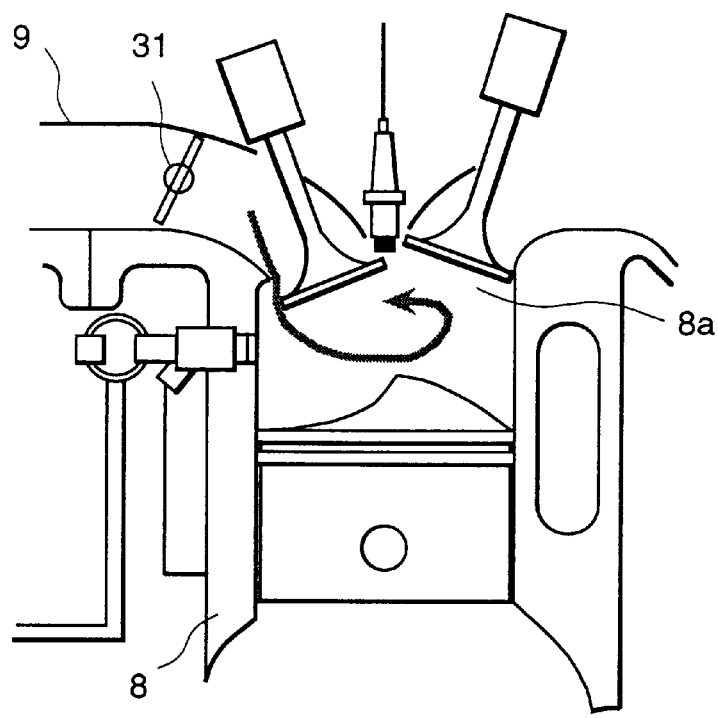
FIG. 8 is a schematic illustration of the general function of the swirl control valve of FIG. 1.

FIG. 8 is a schematic illustration of the general function of the swirl control valve 31. Since the intake air opening degree of the swirl control valve 31 which is provided in the air intake conduit 9 is adjusted, this figure shows the condition in which an alternation force is imparted to the air taken into the combustion chamber 8a of the above stated cylinder 8.

Figure 9:
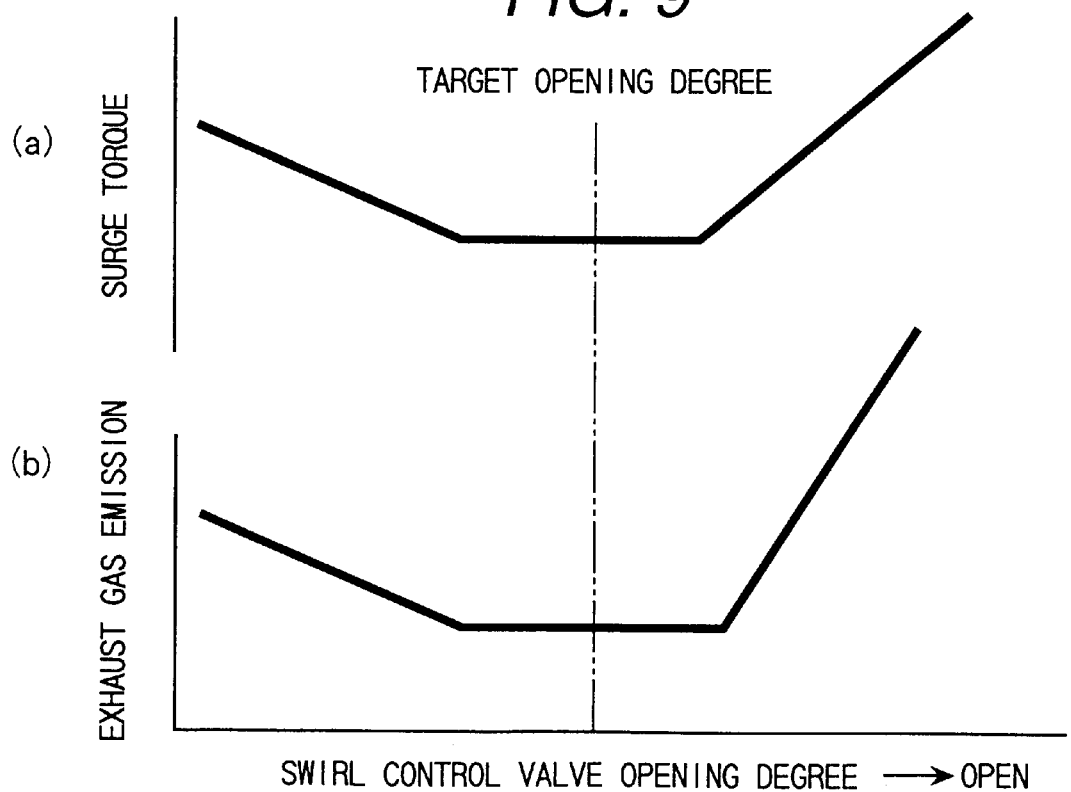
FIG. 9 shows the target opening degree of the swirl control valve of FIG. 1.

FIG. 9 shows the target opening degree of the swirl control valve 31. A position which is designated by two dot line indicates the suitable opening position. As shown in FIG. 9(a), when the swirl control valve 31 is not at a suitable opening position, the surge torque rises and the operability of the vehicle is degraded. As shown in FIG. 9(b), the combustion is also degraded, thereby fostering the generation of hydro-carbons (HC) etc.

Hereinafter, the failure diagnosis performed by the failure detection unit 63 (FIG. 3) will be explained in detail.

Figure 10:
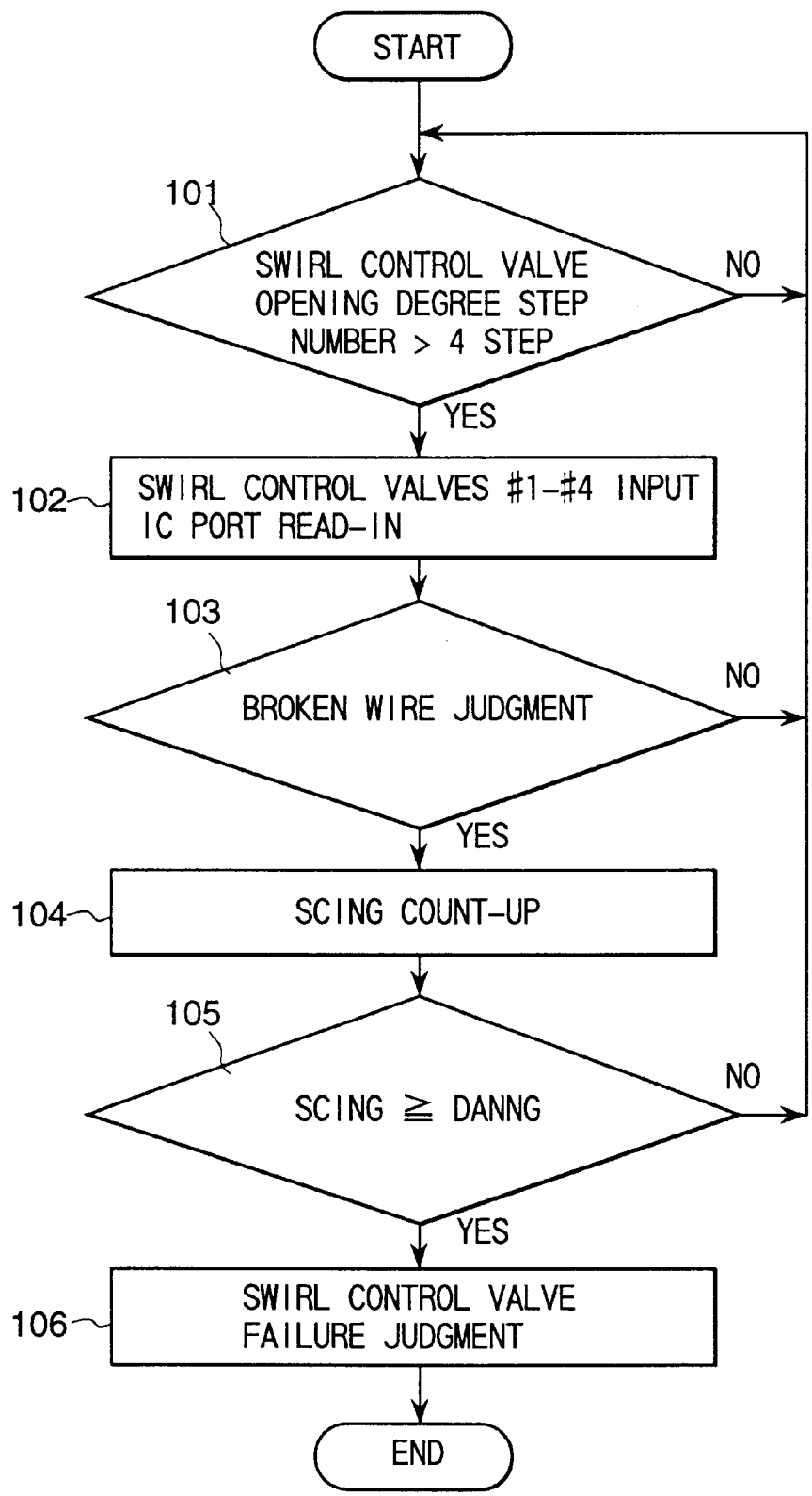
FIG. 10 is a flow chart showing the broken wire diagnosis of the swirl control valve according to the failure detection means of FIG. 3.

FIG. 10 is a flow chart showing the broken wire diagnosis of the above stated swirl control valve 31. As explained in FIG. 5, broken wire detection is carried out from the relationship between the output of CPU 15e and the output of the voltage detection circuit 15e. In a step 101, the opening degree (step number) of the swirl control valve 31 is judged. (Herein, the step number corresponds to the exciting coils 35a–35d of the above stated stepping motor 35.) If the above stated step number is greater than four (4) steps, CPU 15a shown in FIG. 5 reads in the detection voltage from the voltage detection circuit 15e (step 102). Next, in a step 103, the broken wire determination is made. As explained in FIG. 5, if when the output from CPU 15a to the base of the transistor Tr1 is "low", the voltage detection circuit 15e output the "high" signal to CPU 15e; and when the output from CPU 15a to the base of the transistor Tr1 is "high", the voltage detection circuit 15e outputs a "low" signal to CPU 15a, under these conditions the CPU 15a determined that no broken wire exists.

On the other hand, for example, when the broken wire occurs at point A in FIG. 5, as stated above, when the output from CPU 15a to the transistor Tr1 is "low", the signal from the voltage detection circuit 15e to CPU 15a is "low", and when the output from CPU 15a to the transistor Tr1 is "high", the signal from the voltage detection circuit 15e to CPU 15a is "high". In this case, the CPU 15a determines that a broken wire exists.

If it is determined that there is the broken wire, in a step 104 the SCING counter is incremented, and in step 105, it is determined whether or not the count value has reached the regulation NG (DANNG) value. Herein, the regulation NG value is set at a predetermined value, to prevent an erroneous judgment due to count-up of SCING counter by the noises etc.

When the counter reaches the regulation NG value, in a step 106, it is reliably determined that a failure has occurred in the swirl control valve 31.

Figure 11:
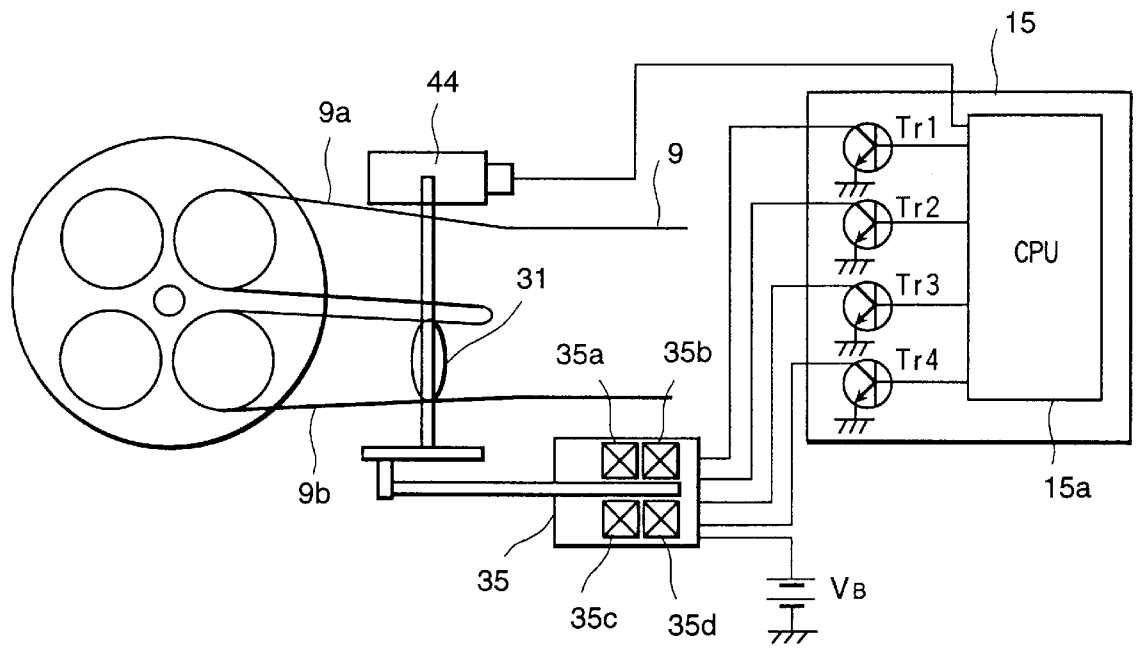
FIG. 11 shows an embodiment in which a swirl control valve opening degree sensor is added to the broken wire detection system of FIG. 4.

FIG. 11 shows system for detecting a broken wire (for example as shown in FIG. 5, between the exciting coil 35a and the transistor Tr1) in which an opening degree sensor 44 is added. In FIG. 11, an opening degree signal output by the CPU 15a is 5 compared with the opening degree signal of the swirl control valve 31 which is detected by the opening degree sensor 44.

Figure 12:
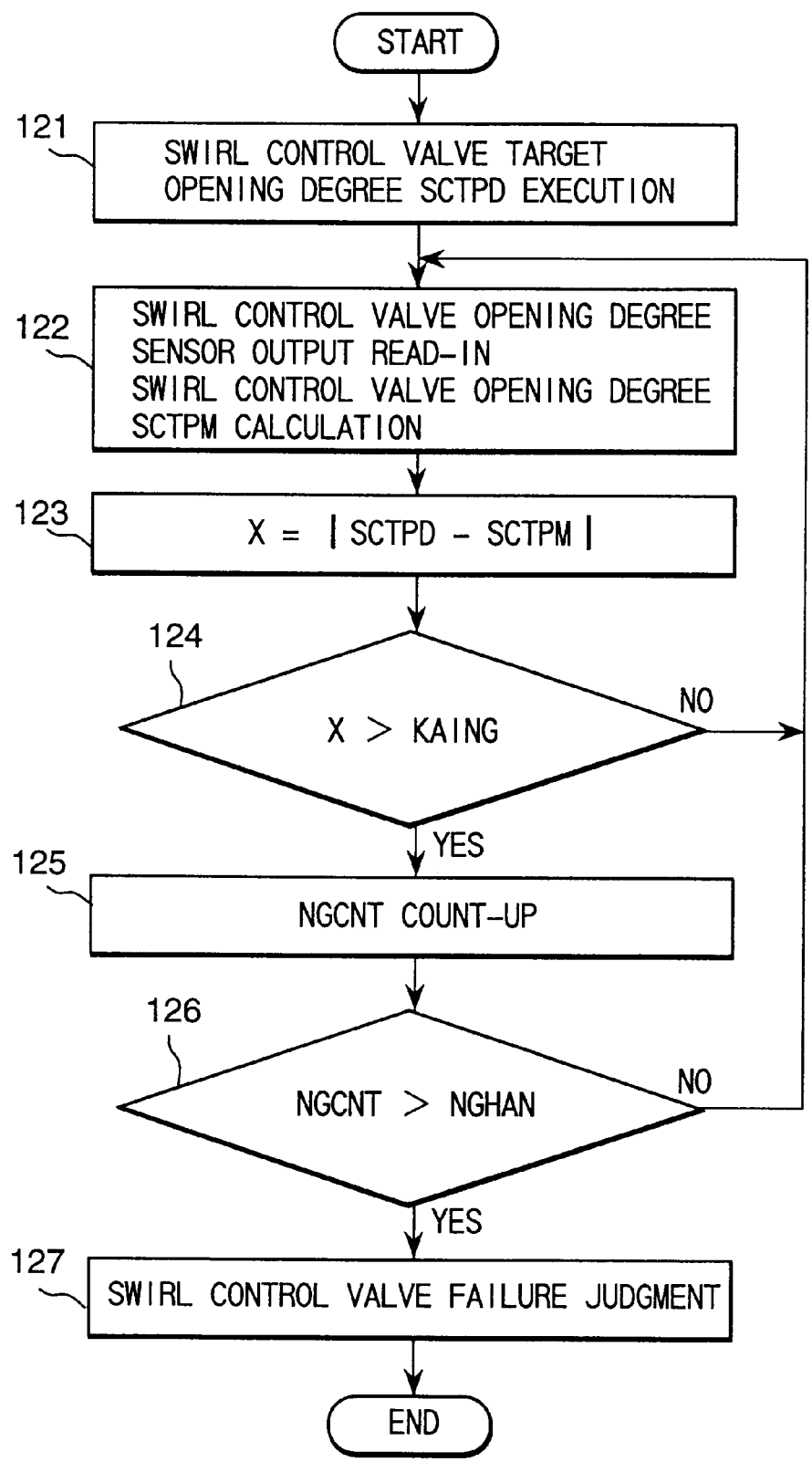
FIG. 12 is a flow chart showing the detection system of FIG. 11.

In this system, for example as shown in FIG. 12, in a step 121, the target opening degree SCTPD of the swirl control valve 31 is determined and outputted, and the opening degree of the swirl control valve 31 by the stepping motor 35 in response to the above stated target opening degree is detected through the opening degree sensor 44. Next, in a step 122, the detection signal (the swirl control valve opening degree SCTPM) is read in from the above stated opening degree sensor 44 according to CPU 15a, and in a step 123, an absolute value X of the difference between the target opening degree SCTPD and the actual opening degree SCTPM from the above stated opening degree sensor 44, is determined. And in a step 124, it is determined whether the value X exceeds a predetermined value. If so, in a step 125, the NGCNT counter is incremented, and in a step 126, it is judged whether the count value NGCNT exceeds the regulation NG value (NGHAN). Herein, the reason for the provision of the regulation NG value, similar to the above, is to prevent an erroneous judgment caused by the count-up according to NG counter. Accordingly, when the count value reaches the regulation NG value, in a step 127, it is judged that the swirl control valve 31 has failed.

Figure 13:
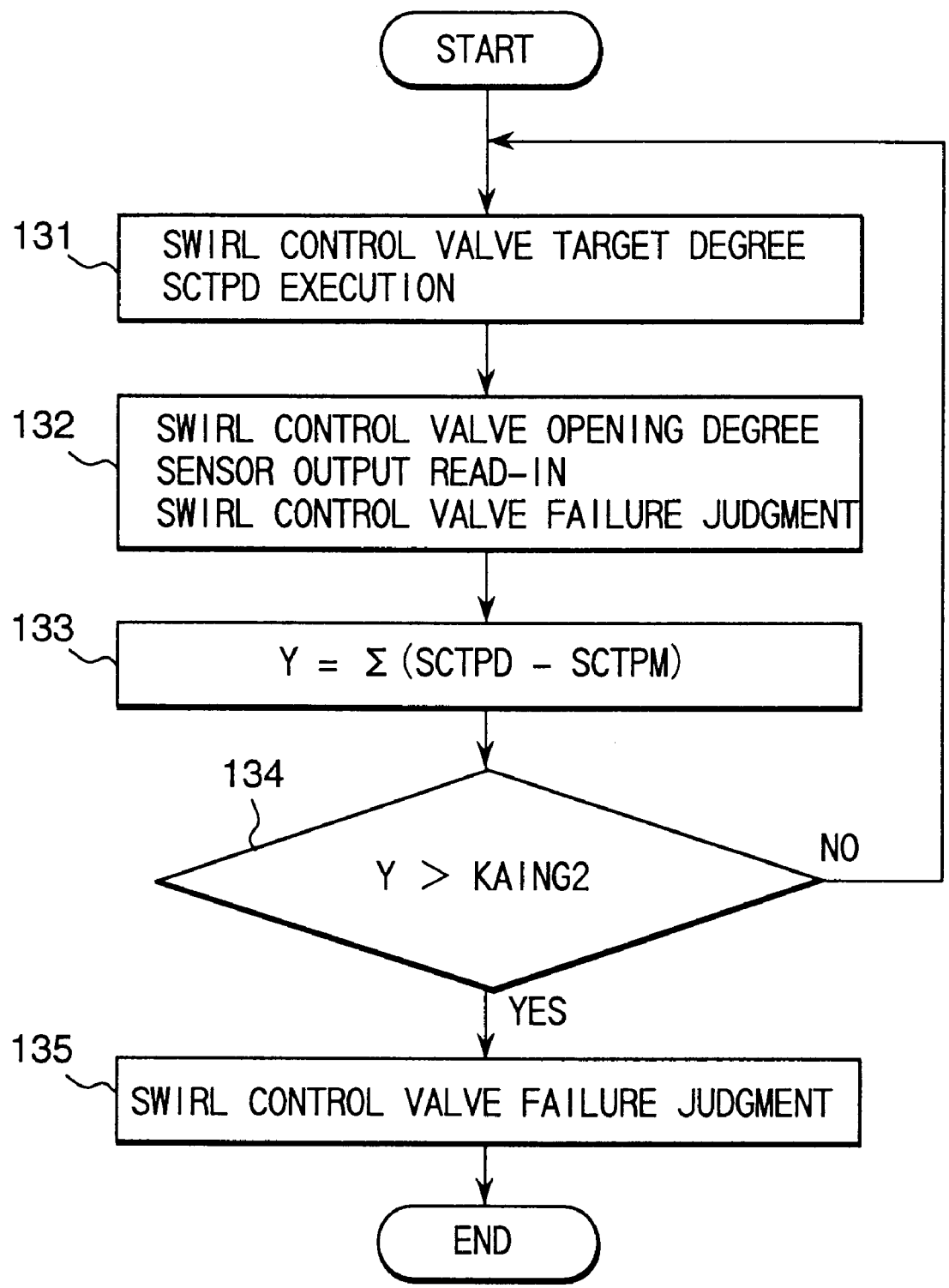
FIG. 13 is a flow chart showing another detection method.

In FIG. 13, the difference between the target opening degree SCTPD and the detected actual opening degree SCTPM from the above stated swirl control valve opening degree sensor 44 is determined by integration. In a step 131, the target opening degree of the swirl control valve 31 is determined and outputted. Next, in step 132, the actual opening degree of the above stated swirl control valve 31 (by the above stated stepping motor 35 in response to the above stated target opening degree) is detected by the swirl control valve opening degree sensor 44, and is read into the CPU 15a. In step 133, a value Y is calculated by integrating the difference between the target opening degree SCTPD and the detection opening degree SCTPM from the above stated swirl control valve opening degree sensor 44. In a step 134, it is judged whether the integrated value Y exceeds the regulation NG value (KING), and if so, the swirl control valve 31 is determined to have failed in step 135.

Accordingly, in this embodiment, since the difference between the target opening degree SCTPD and the opening degree SCTPM from the above stated swirl control valve opening degree sensor 44 is determined quantitatively, the detection accuracy can be improved substantially.

Figure 14:
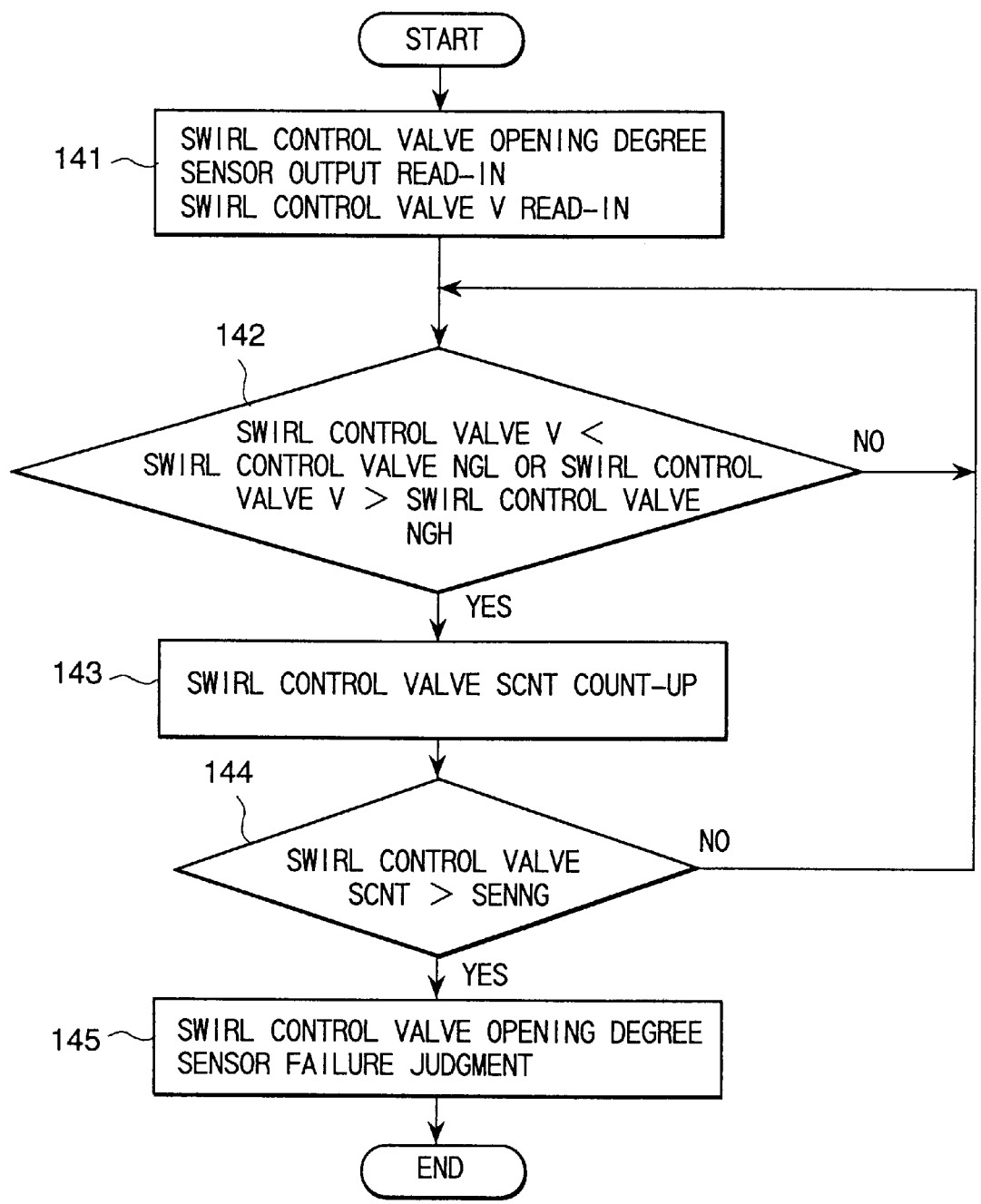
FIG. 14 is a flow chart for judging the detection condition of the swirl control valve opening degree sensor of FIG. 2.

FIG. 14 is a flow chart showing the process for determining the condition of the sensor 44 for detecting the swirl control valve opening degree. In a step 141, the detected output swirl control valve position V is read-in from the above stated swirl control valve opening degree sensor 44. In step 142, the quantity of the detected output swirl control valve V is evaluated. That is, when the detected output swirl control valve position V of the swirl control valve opening degree sensor 44 is below the minimum value NGL or above the maximum value NGH of the above stated sensor output, in a step 143, the swirl control valve SCNT counter is incremented. Thereafter, in a step 144, it is determined whether the count value has reached the regulation NG value (SENNG). (The reasons for the provision of the regulation NG value, similar to the above, is to prevent an erroneous judgment caused by the noises etc.) When the count value reaches the regulation NG value, it is determined that the control valve opening degree sensor 44 has failed. (in a step 145)

Figure 15:
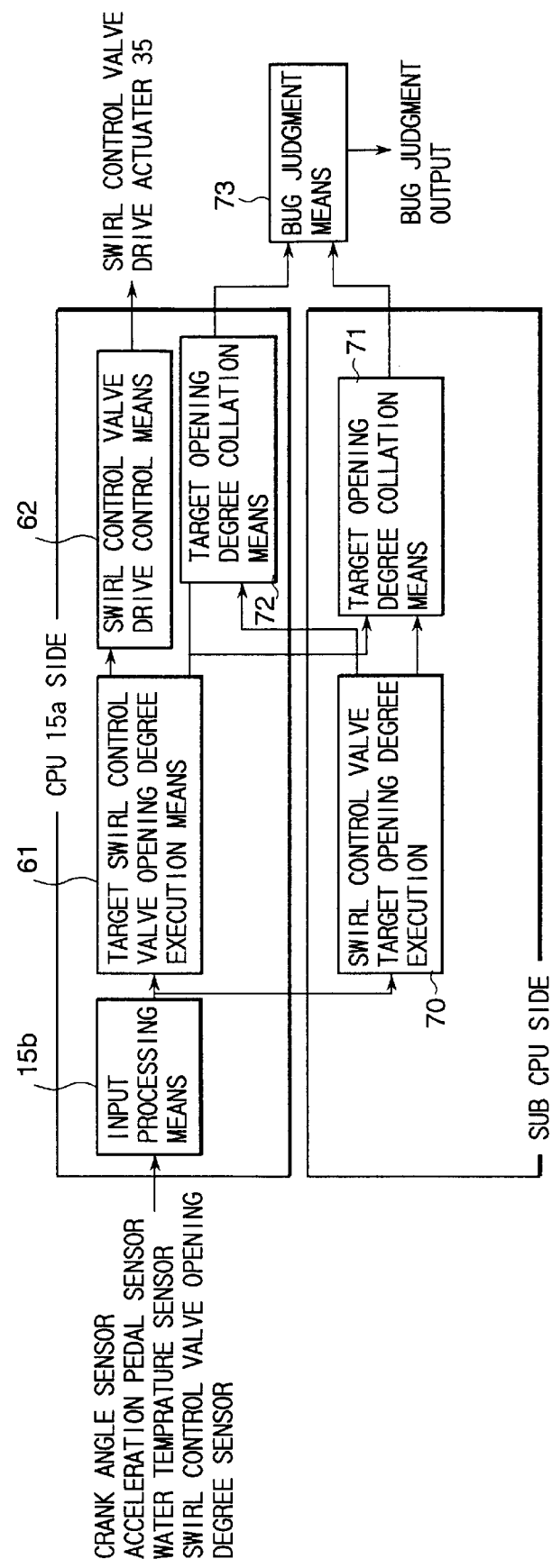
FIG. 15 is a block diagram for explaining the judgment of the correctness of the target opening degree execution by the CPU of FIG. 2.

FIG. 15 shows a block diagram for judging the quality of the target opening degree execution according to signals from the CPU 15a. (Elements in common with that of FIG. 3 are designated by the same reference numerals.)

The CPU 15a (a main CPU) receives for example, the detection signals from the crank angle sensor 16, the acceleration pedal sensor 45, the water temperature sensor 46, and the swirl control valve opening degree sensor 44 etc. (shown in the FIG. 2), via input processing unit 15b. Processing for determining the target opening degree is performed by the target opening degree execution unit 61, and the swirl control valve drive actuator 35 is driven by the swirl control valve drive control unit 62.

Similarly, at the sub CPU side, the above mentioned detection signals are also received from the input processing means 15b. Processing, for determining the target opening degree is performed by the target opening degree execution unit 70 and, in a target opening degree collation unit 71, the result is collated with the target opening degree determined by the target opening degree execution unit 61. In addition, and at the same time, the target opening degree determined by the target opening degree execution unit 61 is collated with the target opening degree determined by the target opening degree execution unit 70, in the target opening degree collation unit 72. If either of the target opening degree collation units 71 and 72 indicates that the collation result is in disagreement, the bug judgement unit 73 generates a signal indicative of the existence of a system fault or a "bug".

Figure 16:
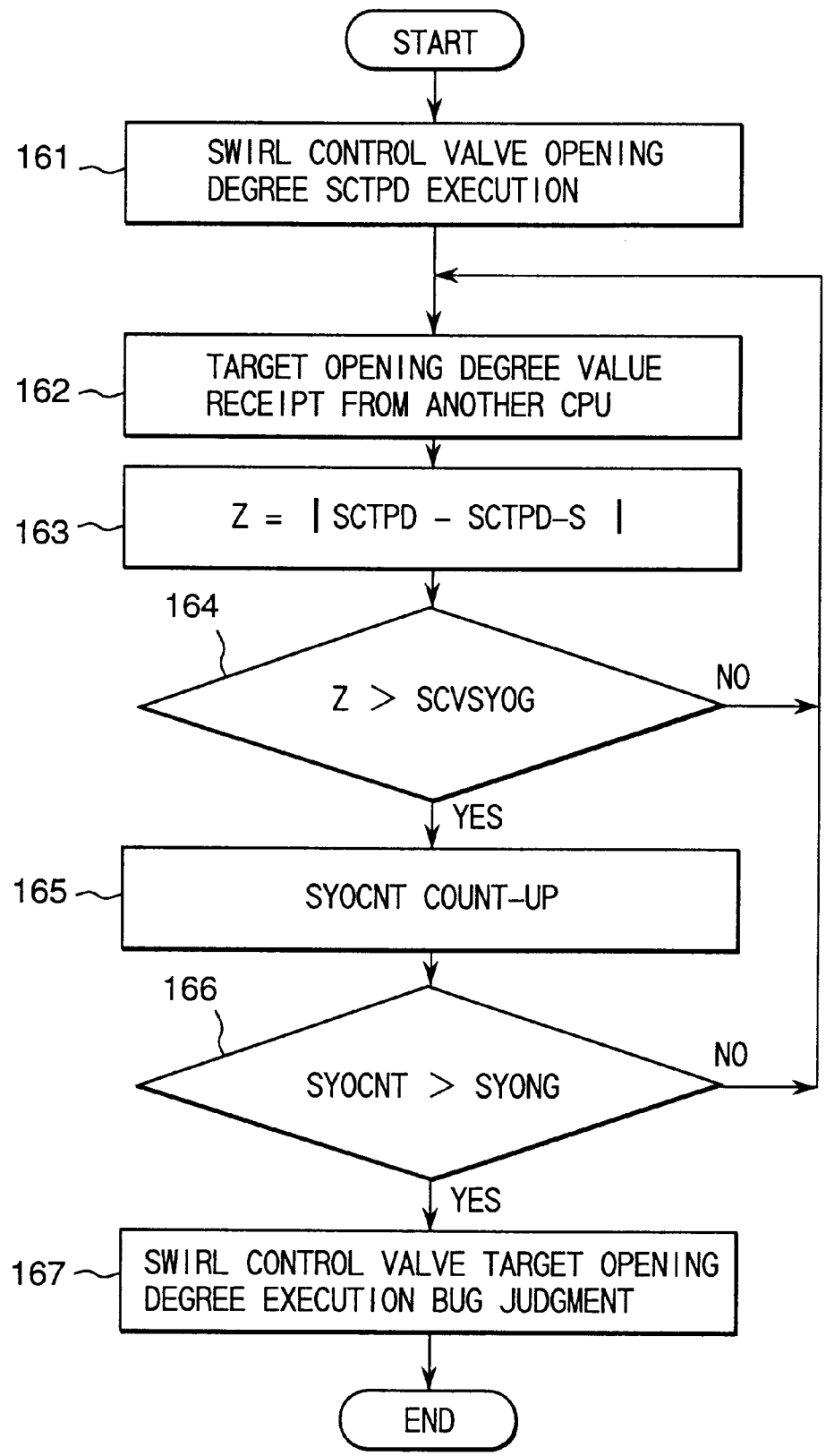
FIG. 16 is a flow chart showing the bug judgment of FIG. 15.

FIG. 16 is a flow chart which shows the bug judgment analysis. In steps 161 and 162, the target opening degree SCTPD is determined by the target opening degree execution units 61 and 70 in both the main CPU 15a and the sub CPU. In a step 163, the target opening degrees are collated in the respective (redundant) target opening degree collation units 71 and 72. The collation in this case is performed, for example, by calculating the absolute value of the difference between the main side target opening degree SCTPD and the sub side target opening degree SCTPD-S.

Next, in step 164, it is determined whether the absolute value Z exceeds a predetermined value swirl control valve SYOG. If so, in step 165, the bug counter (SYOCNT) is incremented, and when the count value exceeds the regulation value (step 166), a signal is generated indicating the existence of a bug.

Figure 17:
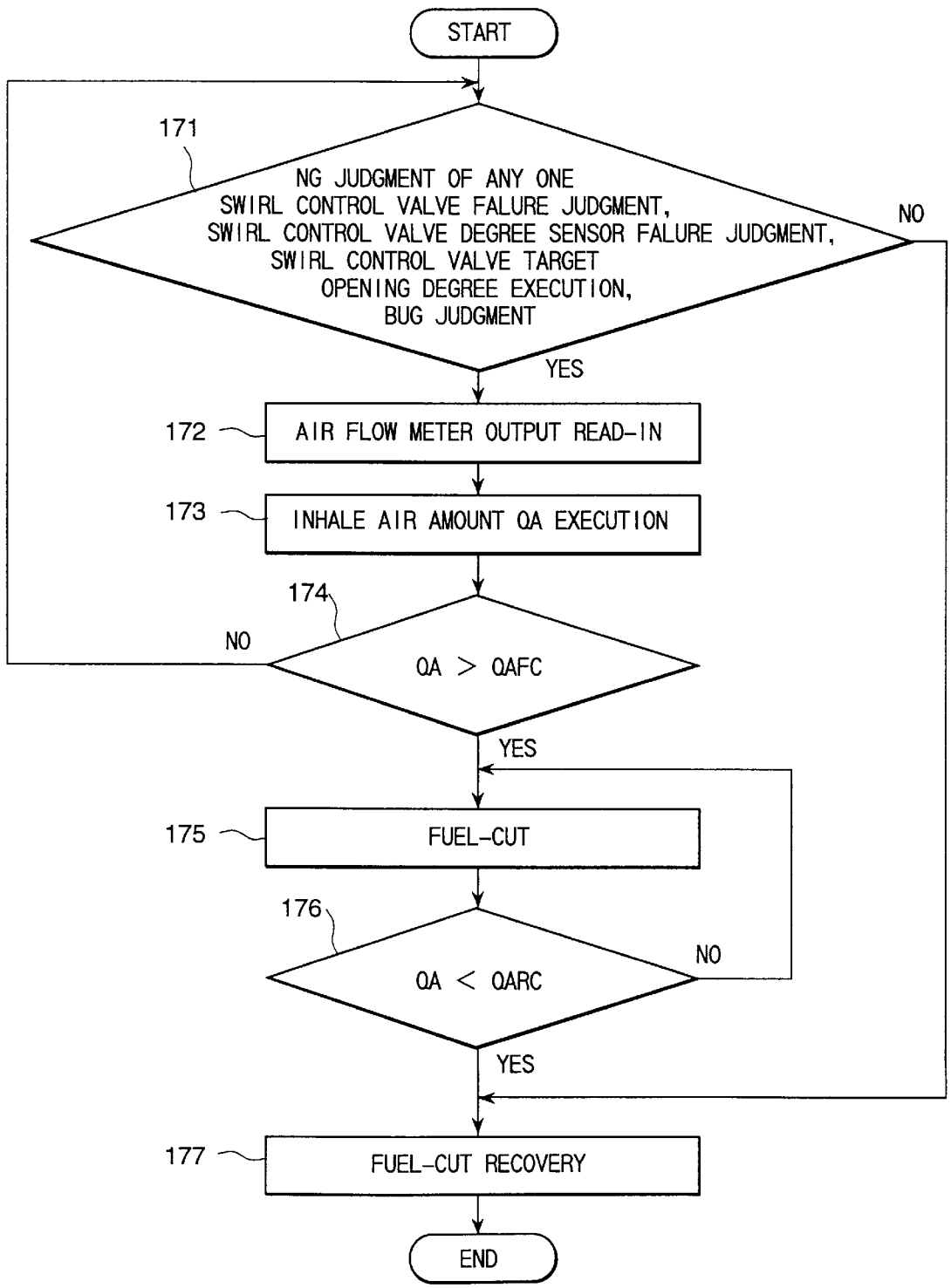
FIG. 17 is a flow chart for explaining the motion after the various kinds of NG judgments according to the failure detection means of FIG. 3.

FIG. 17 is a flow chart which shows the collective implementation of the various judgments set forth above. In step 171, for example, when any one of the broken wire detection unit 64 of the failure detection unit 63, the target opening degree/actual opening degree deviation detection unit 65, the opening degree sensor abnormality detection unit 66, and the target opening degree determination abnormality detection unit 67 (FIG. 3) generates an output which is indicative of an NG judgment, in step 172 the output from the air flow sensor 20 (FIG. 2) is read, and in step 173 the intake air amount QA is determined.

The intake air amount QA the area QAFC, in which the intake air amount is "normal". Thus, when it is determined in step 174, for example, that the intake air amount QA exceeds the range QAFC, a fuel-cut control is carried out in a step 175. Thereafter, when it is determined in step 176 that the intake air amount QA falls below the area QAFC, fuel injection is re-opened in step 177.

Figure 18:
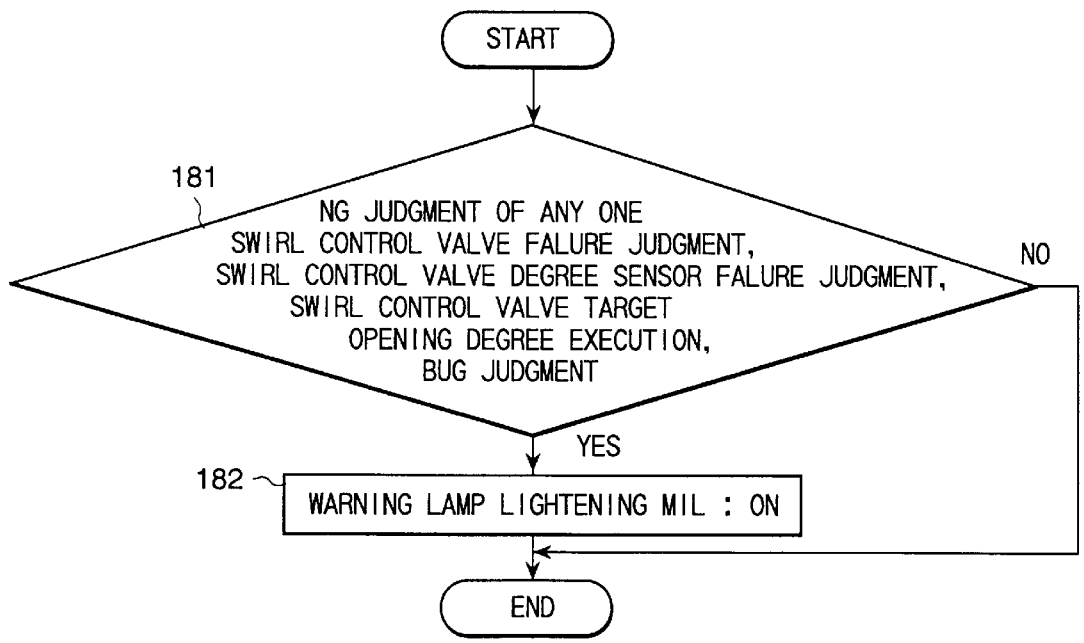
FIG. 18 is a flow chart for explaining the warning after the various kinds of NG judgments according to the failure detection means of FIG. 3.

Further, FIG. 18 shows a flow chart for generating a warning, based on judgments. In a step 181, when any one of the broken wire detection unit 64 of the failure detection means 63, the target opening degree/actual opening degree deviation detection unit 65, the opening degree sensor abnormality detection unit 66, and the target opening degree determination abnormality detection unit 67 (FIG. 3) generates an output which is indicative of an NG judgment, in step 182 the warning lamp 60 is illuminated.

Figure 19:
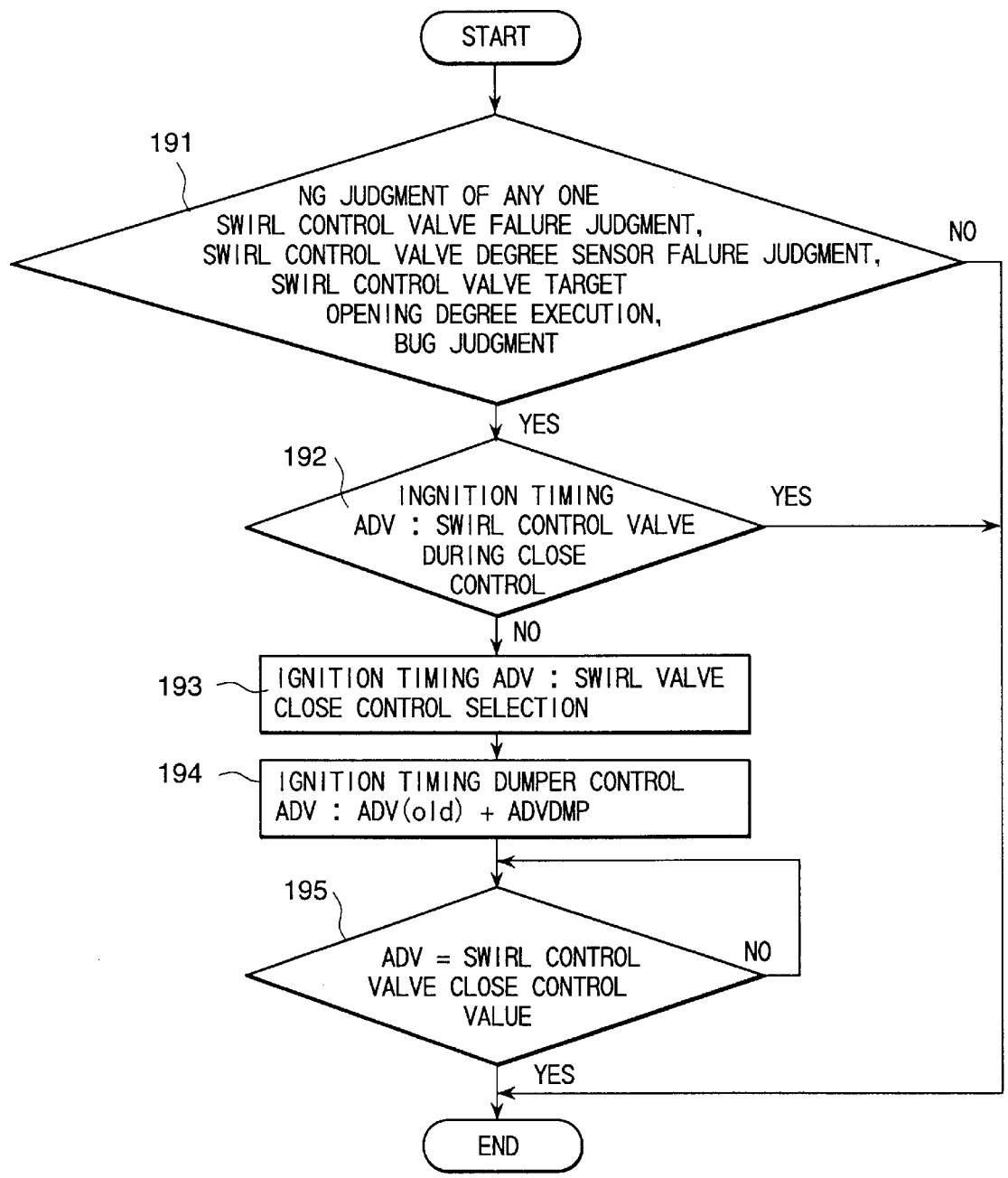
FIG. 19 is a flow chart showing the ignition timing control after the various kinds of NG judgments according to the failure detection means of FIG. 3.
Figure 20:
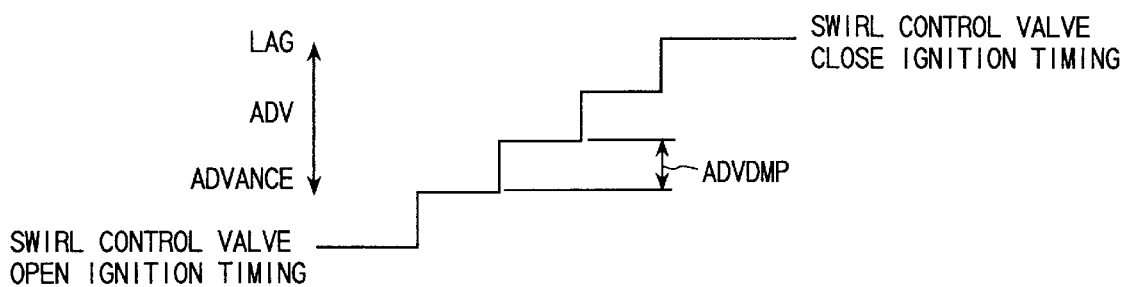
FIG. 20 is a view showing the ignition timing control of FIG. 19.

FIG. 19 shows an ignition timing control flow chart based on the various judgments set forth above. In a step 191, when any one of the broken wire detection unit 64 of the failure detection unit 63, the target opening degree/actual opening degree deviation detection unit 65, the opening degree sensor abnormality detection unit 66, and the target opening degree determination abnormality detection unit 67 (FIG. 3) generates an output which is indicative of an NG judgment, in step 192, it is determined whether the swirl control valve 31 is currently controlled to a closed position. (In general, in order to maintain optimum fuel consumption, when the swirl control valve 31 is controlled to a closed state, the ignition timing ADV is retarded, and when it is controlled to an open state, the ignition timing ADV is advanced.)

Accordingly, when it is judged in step 192 that the above stated swirl control valve 31 is not controlled to a closed state, in step 193 the control mode of the ignition timing ADV is caused to change to the closing control side, and in step 194 the ignition timing ADV is adjusted gradually toward the slow side according to the damper DMP control, in step 195, the swirl control valve 31 is controlled at the closing control mode.

As a result, as stated in above, in a case of an NG judgment, by gradually retarding the ignition timing ADV, the occurrence of the knocking etc. can be restrained. Accordingly, a normal operation sensation (no abrupt increase of torque) can be maintained.

Figure 21:
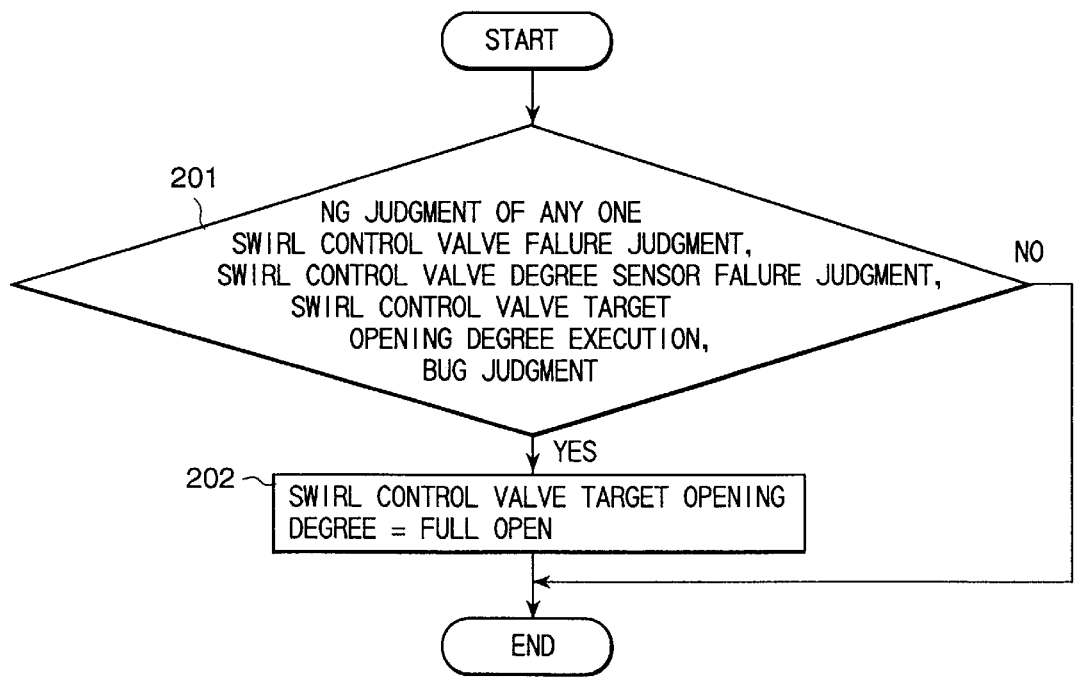
FIG. 21 is a flow chart showing a case where the swirl control valve is fully closed after the various kinds of NG judgments according to the failure detection means of FIG. 3.

FIG. 21 shows a flow chart in which, after the various judgments the swirl control valve 31 is made to fully open. When any one of the detection units makes an NG judgment (step 201), the swirl control valve 31 is made to fully open in step 202. In this manner, degradation of the operability of the internal combustion engine, and of the exhaust gas emissions, can be prevented.

The embodiments of the present invention are explained in detail above. However, the present invention is not limited to the above stated embodiments, but includes such variations or modifications as are within the spirit of the appended claims.

As explained above, in the failure diagnosis apparatus for use in the internal combustion engine according to the present invention, when there is a fault determined by any one of the broken wire detection unit, the deviation judgment unit, the opening degree sensor judgment unit, and the bug judgment unit, the ignition timing etc. can be carried out suitably, and the natural operating feeling (with no abrupt rise torque) can be maintained. As a result, the failure diagnosis of the swirl control valve in the internal combustion engine is carried out surely, and even in case of the occurrence of the failure, good operability can be maintained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a control device for an internal combustion engine having a swirl control valve arranged in an air intake part of said engine and a drive control unit for controlling said swirl control valve, a failure diagnosis apparatus comprising:

a failure detection unit for detecting a failure of said swirl control valve;

a failure judgment unit;

a main control unit for determining a first target opening degree of said swirl control valve;

a sub control unit for determining a second target opening degree of said swirl control valve; and a system fault judgment unit for carrying out a system fault judgment by collating the first and second target opening degrees.

2. In a control device for an internal combustion engine having a swirl control valve arranged in an air intake part of said engine and a drive control unit for controlling said swirl control valve, a failure diagnosis apparatus comprising:

a failure detection unit for detecting a failure of said swirl control valve;

a failure judgment unit;

wherein said failure judgment unit detects existence of a failure when an output indicative of a failure is generated by at least one of a broken wire detection unit, a deviation judgment unit, an opening degree sensor judgment unit, and a system fault judgment unit of said failure detection unit;

and further comprising a failsafe control unit for determining a present intake air amount based on a judgment of said failure judgment unit, and for carrying out a fuel-cut control to maintain the intake air amount within a normal operation range.

3. A control apparatus for an internal combustion engine according to claim 1, wherein said failsafe control unit illuminates a warning lamp when a failure judgment is outputted from any one of said broken wire detection unit, deviation judgment unit opening degree sensor judgment unit, and said system fault judgment unit.

4. A control apparatus for an internal combustion engine according to claim 1, wherein:

said failsafe control unit determines whether said swirl control valve is controlled to a closed state at a time when said failure judgment output is outputted from any one of said broken wire detection means, said deviation judgment means, said opening degree sensor judgment means, and said system fault judgment means; and when said failsafe control unit determines that said swirl control valve is controlled to a closed state, ignition timing of said engine is gradually retarded.

5. A control apparatus for an internal combustion engine according to claim 1, further comprising:

a failure counter for outputting a failure judgment of said broken wire detection unit, said deviation judgment unit, said opening degree sensor judgment unit, and said system fault judgment unit of said failure judgment unit, at a time when a count of said failure counter reaches to a predetermined value.

* * * * *